March 27, 1962 M. R. CLELAND ETAL 3,027,486
CATHODE HEATING APPARATUS
Filed May 23, 1960 3 Sheets-Sheet 1

Marshall R. Cleland
Howard F. Malone,
Inventors.
Koenig and Pope,
Attorneys.

March 27, 1962     M. R. CLELAND ETAL     3,027,486
CATHODE HEATING APPARATUS

Filed May 23, 1960                                    3 Sheets-Sheet 2

Marshall R. Cleland
Howard F. Malone,
Inventors.
Koenig and Pope,
Attorneys.

March 27, 1962  M. R. CLELAND ET AL  3,027,486
CATHODE HEATING APPARATUS
Filed May 23, 1960  3 Sheets-Sheet 3

Marshall R. Cleland
Howard F. Malone,
Inventors.
Koenig and Pope,
Attorneys.

United States Patent Office 3,027,486
Patented Mar. 27, 1962

3,027,486
CATHODE HEATING APPARATUS
Marshall R. Cleland, Huntington Station, and Howard F. Malone, Massapequa Park, N.Y., assignors to Radiation Dynamics, Inc., Westbury, N.Y., a corporation of New York
Filed May 23, 1960, Ser. No. 30,894
21 Claims. (Cl. 315—36)

This invention relates to cathode heating apparatus, and more particularly to high voltage rectification and voltage multiplication apparatus having means for heating the cathodes of the rectifier tubes.

Among the several objects of the invention may be noted the provision of cathode heating apparatus which supplies electrical power to the cathodes of rectifier units without the need of auxiliary sources of power therefor; the provision of such apparatus in which electrical power therefor is supplied from the same power source as is used to eenrgize the anode-cathode circuit of the rectifier unit, but in which the temperature of the rectifier cathodes may be adjusted without changing the potential of the common A.C. power source; the provision of apparatus of this class in which neither of the windings of the cathode energizing transformer is series-connected in the anode-cathode circuit of an associated rectifier unit; the provision of voltage multiplication apparatus including cathode heating apparatus in which only one source of A.C. power is utilized to supply both the anode-cathode circuits of cascaded rectifier units and heat their cathodes and in which cathode temperatures may be maintained at a predetermined value while the potential of said A.C. power source can be varied over wide ranges; the provision of high voltage rectification and multiplication apparatus in which the cathode heating apparatus is protected from damage from high voltage surges, sparking and transistory shorting of the D.C. output terminals; the provision of such apparatus in which the cathode temperatures can be varied without substantially affecting the capacitive reactance component of the rectifier load on the A.C. power source; and the provision of apparatus of the class described which is relatively simple to construct, economical in cost and reliable in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

Corresponding reference characters indicate corresponding parts throughout the several views of the drawings.

The supplying of power to heat the cathodes of the rectifier units of cascade type voltage multiplication apparatus presents a number of difficulties. Extremely high A.C. and D.C. potential differences are developed between the rectifier units and adjacent apparatus components so that serious problems as to insulation and isolation arise. A number of widely varying approaches have been used to overcome these problems relative to cathode heating but all entail certain disadvantages. For example, individually mechanically driven generators (one for each rectifier), batteries, isolation transformers, and various circuit arrangements using individual transformers for each rectifier unit have been employed. However, some of these apparatus are too bulky, expensive or complex; or require more than one A.C. power source; or are subject to damage in the event of arcing or sparking which would cause a transistory short or excessive current discharge through some or all of the rectifier stack; etc.

In accordance with the present invention, apparatus for heating the cathodes of high voltage rectifier units is provided which is not subject to any of the above defects or drawbacks. Only a single A.C. power source is needed to supply both the cathode heating power and to energize the rectifier anode-cathode circuits. In essence, apparatus of this invention comprises a separate transformer associated with each rectifier unit and having one winding connected across the filament to heat the cathode and a second winding having two terminals. A single A.C. power source is coupled to the anode of the rectifier unit and one of these winding terminals is also utilized to establish an A.C. electric field. A metallic probe electrode is connected to the other one of these winding terminals and this probe is positioned within this electric field. The energy capacitively coupled via the probe electrode from this A.C. field to the other winding terminal produces an A.C. potential across this winding and powers the first transformer winding to heat the rectifier cathode. By varying this capacitive coupling the temperature of the cathode can be conveniently adjusted. Each of the rectifiers of a cascade rectifier apparatus may have a separate structure associated therewith and a common control means for simultaneously or individually varying the capacitive pick-up or coupling of each of the probe electrodes relative to the electric field.

Figure 1:
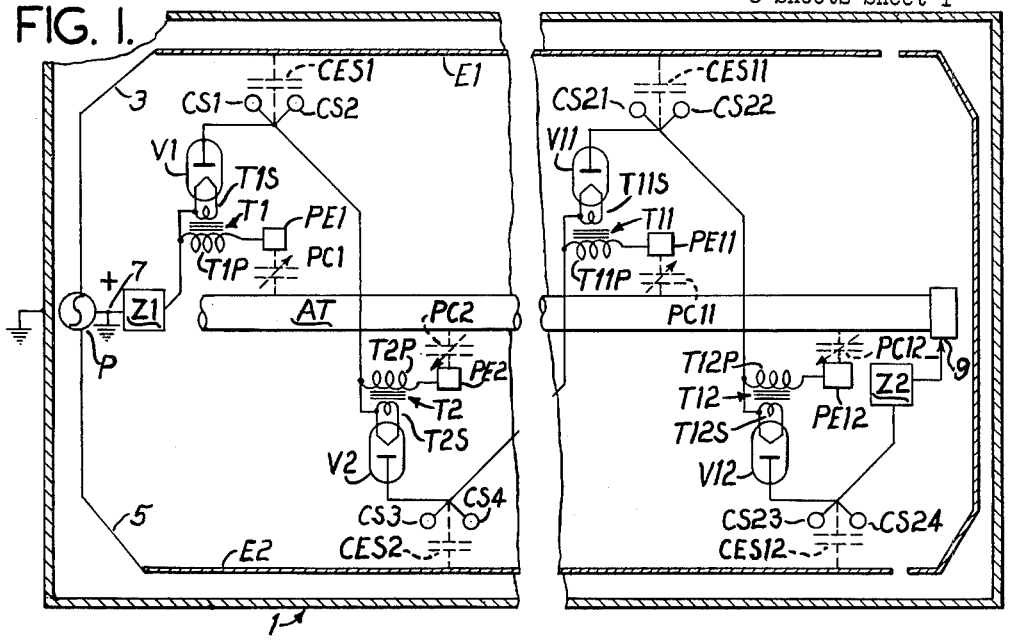
FIG. 1 is a schematic representation of the electrical circuitry of one embodiment of the present invention.
Figure 2:
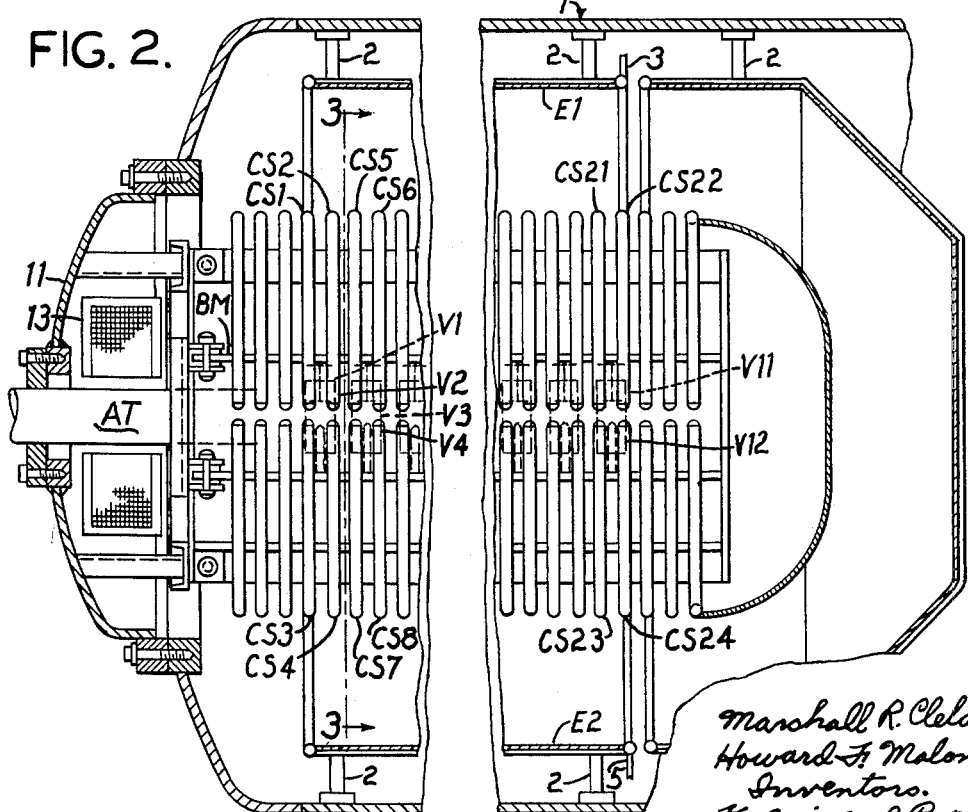
FIG. 2 is a side elevation of a structural embodiment of the FIG. 1 circuit, with parts broken away.

Referring now to the drawings, and more particularly to FIGS. 1 and 2, an electrically grounded, heavy metal cylindric gas-tight pressure container or tank is indicated at reference numeral 1. Enclosed and supported by stand-off insulators 2 within tank 1 is a pair of spaced elongate opposed metallic electrodes or shells E1 and E2. Also enclosed within tank 1 is an A.C. power source P, which for example may be constituted by an inductor to which A.C. power is coupled, or which is a part of a tank circuit for an oscillator or power amplifier. The power source P is connected by conductors 3 and 5 to the shell electrodes E1 and E2 thereby to impress a high potential A.C. voltage thereacross, e.g. in the order of 50,000–300,000 v. at a frequency in the range of 20–300 kc. Connected between ground, which constitutes a positive polarity high voltage D.C. terminal as indicated at 7, and a negative polarity high voltage D.C. terminal as indicated at 9 are a plurality of rectifier units V1–V12, each having an anode and a filament which comprises a hot cathode. These rectifier units (each of which may include one or more rectifier tubes) are series-connected anode-to-cathode between these D.C. terminals 7 and 9. At each of the junctions formed at a point of interconnection between the anode of one rectifier unit and the cathode of the next successive rectifier unit is connected at least one curved metallic corona shield. Thus, at the junction between the anode of V1 and the cathode of V2 two corona shields CS1 and CS2 are connected. These corona shields CS1 and CS2 are adjacent but spaced away from the inner surface of E1. Similar corona shields CS3 and CS4 are interconnected at the anode-cathode junction of V2 and V3, while identical corona shields CS21, CS22 and CS23, CS24 are connected to the anodes of V11 and V12 respectively. The shields connected to the anodes of the V2, V4–V12, i.e., the even-numbered, rectifier units are positioned adjacent but spaced away from the inner surface of electrode E2. A transformer is associated with each of the rectifier units as indicated at T1, T2, etc. Each of the transformers has a first winding or secondary T1S, T2S, etc., connected across the filament of its rectifier unit and a second or primary winding T1P, T2P, etc., having one terminal thereof connected to the filament or cathode of the rectifier and the other winding terminal connected to a probe electrode as indicated at PE1, PE2, etc.

Figure 3:
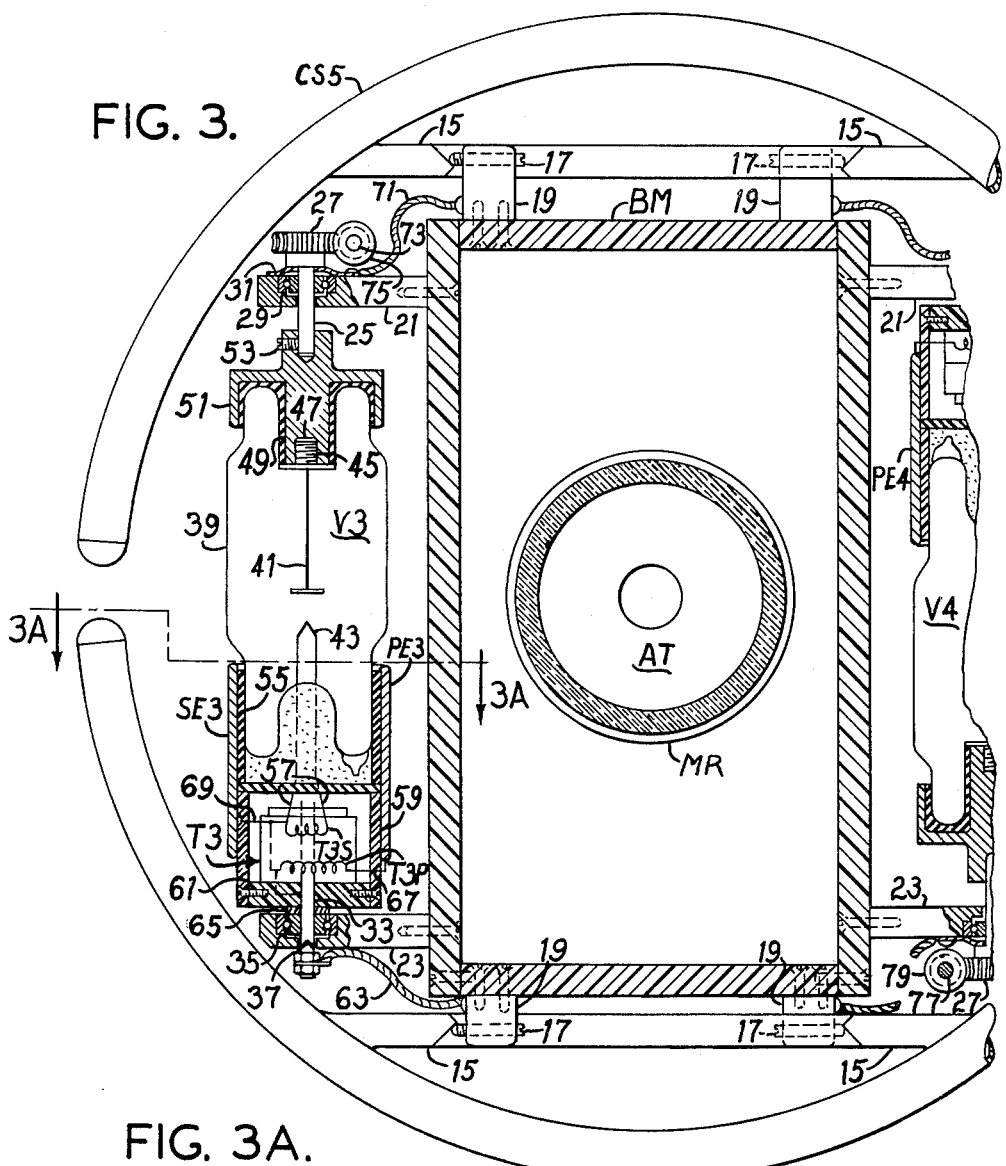
FIG. 3 is an enlarged cross section taken on line 3—3 of FIG. 2.

An elongate evacuated accelerator tube AT is also interposed between the electrodes E1 and E2 with its longitudinal axis generally coincident with the central longitudinal axis of symmetry of electrodes E1 and E2. The accelerator tube has spaced along its length a series of concentric parallel metallic grading rings MR (FIG. 3). The accelerator tube is electrically connected between the high voltage D.C. terminals 7 and 9 to impress a high D.C. voltage accelerating potential (e.g., in the order of 1–4 mev.) along its length. Any conventional source of charged particles such as electrons or ions, etc., may be provided at the proper polarity end of the tube for injecting these charged particles into the evacuated tube so that they may be accelerated down the length thereof. The D.C. current path for this cascade type voltage multiplication apparatus includes two impedances Z1 and Z2, constituted preferably by R-F chokes, which provide a high impedance for R-F currents but a relatively low resistance D.C. path.

A more detailed illustration of the structural association and an exemplary physical mounting arrangement of the corona shields, rectifier units, transformers, probe electrodes, and accelerator tube is presented in FIG. 3. This assembly of components is supported within the tank 1 and centrally positioned between the opposed shell electrodes E1 and E2 by means of an elongate hollow box beam or support BM of insulating material (e.g., "Plexiglas") cantilevered out from a removable end cover 11 of tank 1 through which the end of accelerator tube AT projects. Also supported within this end cover 11 and coaxially mounted relative to the axis of AT is a beam focusing coil 13.

Each of the arcuate tubular corona shields is detachably secured to beam BM in the same fashion as are corona shields CS5 and CS7. That is, each of the corona shields has a pair of inwardly directed projections 15 adapted for snap engagement by spring-loaded pins 17 which are provided at the outer ends of conducting studs 19, each of which is secured to beam BM. Projecting laterally from the side members of BM are upper ribs 21 and lower ribs 23 of insulating material. A shaft 25, one end of which carries a worm wheel 27, is journalled in ball bearing 29 mounted in rib 21. A spring washer 31 provides a conductive rotating connection with shaft 25. Another shaft 33 is journalled for rotation with a ball bearing 35 mounted in lower rib 23. The lower end of shaft 33 is recessed and is engaged by a pointed spring-loaded pin 37 also affixed to the lower rib 23. Mounted between the opposing ends of these aligned or coaxial shafts 25 and 33 is the rectifier unit V3 and its associated components. This rectifier unit V3 comprises a usual glass envelope 39 enclosing an anode 41 and a cathode 43 (which may be of either the directly or indirectly heated type). The anode lead is brought out the top of the envelope and connected to an anode terminal 45 which is screw-threaded for engagement in a central threaded recess 47 of a depending stem 49 of a plate cap 51. The upper end of cap 51 is centrally bored to accommodate the end of shaft 25. A set screw 53 is provided to engage and lock shaft 25 to cap 51 thus coupling the entire rectifier unit assembly for rotation on the vertical axis of shafts 25 and 33. The lower end of rectifier tube envelope 39 has secured thereto an insulating cup 55 through the bottom of which extend the cathode leads 57. The space between the bottom of the glass envelope 39 and the inner surfaces of cup 55 is preferably filled with a potting compound to increase the strength of the rectifier tube and to enable it to withstand high positive tank pressures. Depending from the bottom of cup 55 is an insulating sleeve 59, the lower end of which carries a removable end closure 61. Mounted within the enclosure formed between the cup bottom and closure 61 is the transformer T3. One terminal of the primary winding T3P is electrically connected to the shaft 33. A flexible conductor 63 interconnects the pin 37 to the corona shield mounting stud 19. A metal collar 65 spaces the undersurface of closure 61 from bearing 35.

A split metallic ring assembly is secured to the outer surfaces of cup 55 and its sleeve extension 59. One of the halves of this assembly constitutes the probe electrode PE3 which is electrically connected via wire 67 to the other terminal of winding T3P. The other half of the split ring comprises a probe shielding electrode SE3 which is connected to the cathode 43 of V3 by a wire 69. Another flexible conductor 71 interconnects (via spring washer 31) the anode of rectifier V3 with stud 19 and corona shields CS5 and CS6. Each of the other rectifier units is identically mounted except that the even-numbered rectifier units (which are located on the other side of beam BM) are inverted, i.e., the anodes 41 and worm wheels 27 etc. are down instead of up, bearings 29 are mounted in lower rib 23 and bearings 33 are mounted in upper rib 21 on the right (as viewed in FIG. 3) side of the voltage multiplication apparatus.

A drive shaft 73 runs the length of the apparatus and carries a series of worms 75 each adapted to engage wheels 27 on each of the odd-numbered rectifier units, thus providing a worm gear drive for each of these rectifier unit assemblies adapted to rotate them simultaneously around their vertical axes. A similar drive shaft 77 carries a series of worms 79 each of which engages a respective wheel 27 of the even-numbered rectifier units, thereby forming a number of worm gear drives for simultaneously rotating these rectifier units about their respective vertical axes. These two shafts 73 and 77 may be cross-connected for operation by a single drive means which would project outside tank 1.

Operation of the apparatus of FIGS. 1–3 is as follows:

Power from source P is capacitively coupled to the anode-cathode circuits of V1–V12 rectifier units via the interelectrode capacitances (indicated at CES1–CES12 in FIG. 1) between the electrodes E1 and E2 and the adjacent respective corona shields CS1–CS24. Thus, a high A.C. or R-F potential is applied between each set of corona shields CS1, CS2 and CS3, CS4, etc. and which establishes a generally planar electric field between each successive set of corona shields. The substantially equal A.C. potentials thereby applied effectively in parallel across successive junctions between the cascaded rectifier units supply power to the anode-cathode circuits of these units and the rectified D.C. output is series-connected to provide the high voltage D.C. for operation of the beam tube AT. The electric field established between sets of opposite corona shields is utilized to heat the cathodes of these rectifier units. This is accomplished by means of the probe electrodes PE1–PE12 and rotation of the rectifier units to which these electrodes are affixed. More specifically, and as illustrated by FIG. 3, CS5 and CS7 are at opposite instantaneous polarities (i.e., 180° out of phase) with respect to the potential supplied thereto and AT is physically positioned at a neutral axis therebetween. Thus, the potential of AT relative to the R-F field between opposite corona shields CS5 and CS7 is always neutral or zero. By positioning probe electrode PE3 in this R-F field between AT and CS7, for example, power is coupled via the capacitance provided by the metal plate PE3 and the grading rings MR of the accelerator tube AT. This capacitance between each probe electrode and the neutral R-F axis is indicated at PC1, PC2–PC12 in FIG. 1. As rectifier V3 is rotated the relative capacity or capacitive coupling PC3 is varied and the potential on the terminal of winding T3P is accordingly modified relative to the other terminal of winding T3P which is directly connected to CS7. It will be noted that even in the absence of AT, the probe electrode PE3 will similarly function to provide a variable potential to its T3P terminal in response to its positioning within the R-F field. The principal difference is simply that there is no tangible metallic conductor actually positioned along the neutral axis of the R-F field between CS5 and CS7, but the R-F gradient between these opposed corona shields still is effective to provide the energy pick-up necessary to heat cathodes 43.

Figure 3A:
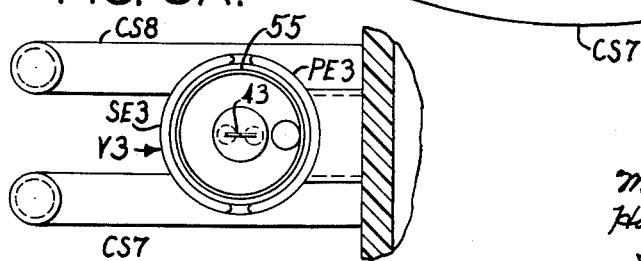
FIG. 3A is a cross section of a rectifier unit taken on line 3A—3A of FIG. 3.

The position of PE3 in this electric field as illustrated in FIGS. 3 and 3A provides a maximum potential across T3P. As PE3 is moved either clockwise or counterclockwise on the axis of V3 so that it approaches CS7 and CS8, the potential picked up diminishes. When PE3 is in an opposite position, i.e., rotated 180° from that shown in FIG. 3A, the potential impressed on the T3P terminal connected to PE3 approximates that of the other T3P terminal which is connected to CS7 and CS8. Thus, minimum or zero energy is supplied to T3P in such a position. The temperature of each of these rectifier units can thus be adjusted conveniently to any desired value by operation of drive shafts 73 and 77. The temperature of the cathodes may be measured by means of a photoelectric cell or by mounting an extra transformer assembly at the grounded end of the apparatus for synchronous rotation of its probe electrode with those of the other transformer and connecting the secondary of this extra transformer to an R-F ammeter. If the potential of A.C. power source P is changed, readjustment of shafts 73 and 77 will correct the cathode temperature. The transformers T1–T12 are not resonant and therefore are substantially unaffected by frequency change. Moreover, no insulation problems are presented and these transformers may be compact in size as illustrated by their being mounted in the small recess provided at the base of each rectifier tube. Another significant advantage is that surges or sparking in the D.C. circuit will not damage these transformers inasmuch as neither winding is connected in series with the anode-cathode circuits of the cascaded rectifier string.

The shielding electrodes SE1–SE12 are an optional but desirable feature of the present invention. The voltage multiplication and cathode heating apparatus of the present invention will operate quite satisfactorily without the use of shielding electrodes, but there is an advantage to using them. If no shielding electrodes are used, the effective capacitance between each opposed set of corona shields would be changed to some extent as the probe electrodes are spatially adjusted. However, with the shielding electrodes, the net capacitance is not changed as the metal plates which constitue SE1–SE12 move with PE3 and maintain substantially the same capacitive parameters relative to the corona shields, rectifier tube, etc. regardless of positioning of the split-ring assembly constituted by each associated probe and shield electrode.

Figure 4:
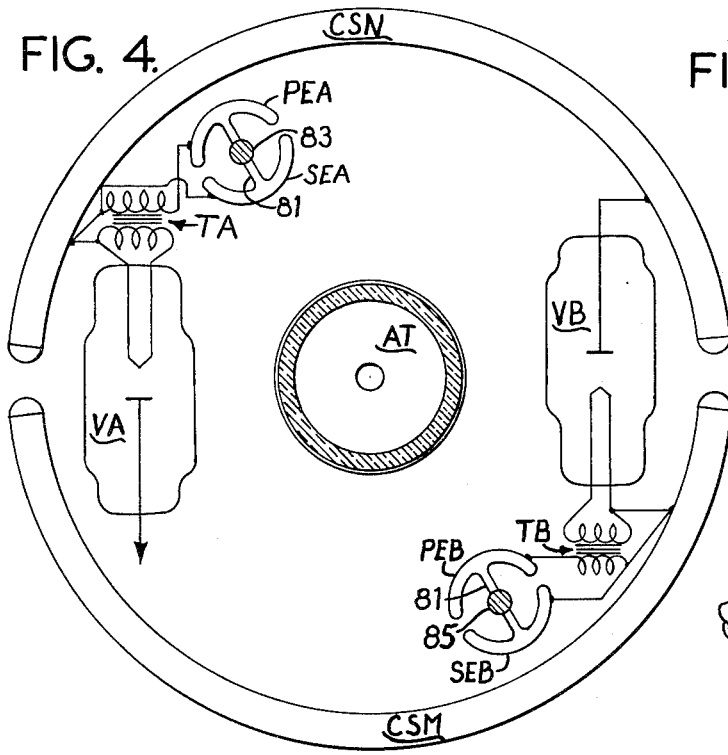
FIGS. 4–6 are schematic representations of additional embodiments of the present invention.

Referring now to FIG. 4, a second embodiment of the invention is depicted. Two rectifier units are series-connected anode-to-cathode as indicated at VA and VB. A transformer TA has its secondary winding connected across the cathode of VA and one terminal of its primary winding connected to a corona shield CSN and to a curved probe shielding electrode SEA. This corona shield is also connected to the cathode of VA. The other terminal of the primary winding of TA is connected to a curved probe electrode PEA. These two electrodes are secured by means of an insulating support member 81 to a rotary shaft 83. The anode of VA is connected as indicated by the arrow to the cathode of another rectifier unit in an adjacent section of the cascade rectifier or to the negative polarity high voltage D.C. terminal of the rectifier stack. A similar assembly of a transformer TB, a rectifier unit VB and shielding and probe electrodes SEB and PEB are positioned symmetrically but in an inverted position (cathode down) on the other side of the central axis of the high voltage rectification apparatus of which VA and VB are two modular units. The anode of VB is connected to corona shield CSN while its cathode is connected to corona shield CSM. Electrodes PEB and SEB are interconnected with TB, VB and CSM in the same fashion as PEA and SEA were interconnected with TA, VA and CSN. In this instance, however, insulating support member 81 is secured to a rotary shaft 85.

Operation of the FIG. 4 embodiment is quite similar to that of the apparatus of FIGS. 1–3. That is, A.C. power is coupled to CSN and CSM, thus applying thereacross a high A.C. potential and establishing an A.C. electric field between CSN and CSM. The shaft 85 is adjusted so that probe electrode PEB is spaced the maximum distance from CSM and faces CSN and AT. PEB is thereby positioned in the A.C. field to pick up A.C. energy and develop and A.C. potential across the primary winding of TB, the other terminal of which is commonly connected to CSM and SEB. The cathode of VB will therefore be energized at a maximum level. For purposes of illustration, electrodes PEA and SEA are shown rotated to a reverse position, i.e., PEA being closest to CSN and SEA being interposed between PEA and CSM as well as AT. Thus, SEA shields PEA and prevents transfer of A.C. energy from the field to PEA. Also PEA is positioned so close to CSN that its potential in the field is substantially identical to CSN and therefore there would be no potential difference established between the terminals of the primary winding of TA and the cathode of VA would not be heated. Intermediate positioning of the probe and shielding electrodes between the maximum and minimum positions exemplified by PEB, SEB and PEA, SEA respectively would, of course, energize the cathodes of the respective rectifier units at temperatures between these two extremes. It will, of course, be understood that control shafts 83 and 85 may be ganged or geared together for synchronous operation.

Figure 5:
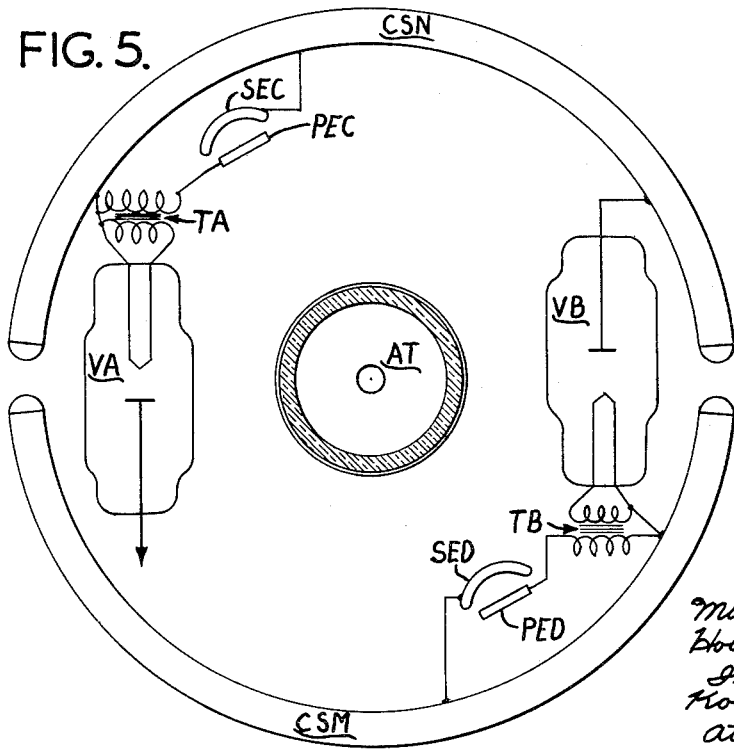

In the first embodiment (FIG. 1–3), each of the probe electrodes is rotated about an axis within the plane of its respective field between an associated set of opposed corona shields, while in the second embodiment each probe is rotated in its respective field about an axis normal thereto. In the third embodiment illustrated in FIG. 5, the probe electrodes, as indicated at PEC and PED, are fixed in position and extend in a plane normal to that of their electric fields, and movable curved shielding electrodes SEC and SED are utilized. The shielding electrode SEC is connected to the adjacent corona shield CSN while SED is connected to CSM. In this embodiment the cathode temperatures are controlled by rotating each of the shielding electrodes about a central axis of its respective probe electrode which axis is parallel the axis of tube AT (i.e., normal to each of the electric field), thus exposing more or covering more of the probe electrode surface. By exposing more probe electrode surface to the field (as is illustrated by the positioning of SEC relative to PEC), increased energy is coupled to the primary winding of the transformer. Similarly, the temperature of the cathodes can be reduced by decreasing the coupling between PEC in the electric field, as illustrated by the position of SED relative to PED. In this embodiment, the other shielding electrodes aligned with SEC would be carried by a common shaft aligned aparallel to the axis of AT and would be adjusted by movement along this axis to control the cathode temperatures. Similarly, SED would be carried by a common shaft parallel to AT on which are also mounted the shielding electrodes aligned therewith.

Figure 6:
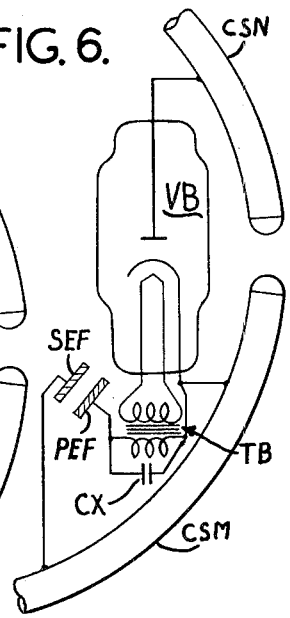

The embodiment of FIG. 6 shows still another arrangement for energizing the individual filament transformers associated with the respective cascaded rectifier tubes. In this embodiment, flat or planar probe electrodes, as indicated at reference character PEF, are connected to one terminal of each of these transformers and are positioned in the respective fields established between the opposed sets of corona shields. The other terminal of each of the primary windings is connected to the cathode of the associated rectifier tube, which in this instance is shown as an indirectly heated type. A similar flat metallic plate SEF is positioned adjacent but spaced from PEF, which serves as a shielding electrode therefor and is electrically connected to the adjacent corona shield CSM. Operation of this cathode heating apparatus is similar to that described above in regard to the preceding embodiments. Relative movement of SEF and PEF to control the energization of the rectifier cathode is accomplished by mounting either of these electrodes on a rod adapted for movement along an axis parallel to a central axis of the apparatus and normal to the plane of the electric field.

It is to be noted that the FIG. 6 embodiment also includes a capacitor CX shunt-connected across the primary winding of TB. The capacity of CX is preferably chosen so that the LC circuit formed by it and the primary winding will resonate at approximately the R-F frequency of the A.C. power source P. This optional feature enhances the flow of current in the primary winding of TB thus permitting lesser coupling capacitance to PEF from the A.C. field for the same degree of filament energy or heating. That is, the size of PEF can be made smaller or it may be positioned less closely to AT or CSN to pick up sufficient energy to heat the filament of VB.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In high voltage rectification apparatus including a source of A.C. power and a rectifier tube having an anode and a filament, a transformer having a first winding connected across said filament and a second winding having two terminals, said A.C. power source being coupled to said anode and one of said terminals and establishing an A.C. electric field exteriorly of said rectifier tube, and a metallic electrode connected to said other terminal and positioned exteriorly of said rectifier tube and in said electric field whereby A.C. is capacitively coupled via said electrode from said power source to establish an A.C. potential across said second winding and thereby energize said first winding to heat said filament.

2. In high voltage rectification apparatus as set forth in claim 1, said rectifier having a directly heated cathode constituted by said filament and said second winding being also connected to said first winding.

3. In high voltage rectification apparatus as set forth in claim 1, said rectifier having an indirectly heated cathode and said one terminal being also connected to said cathode.

4. Voltage multiplication apparatus comprising first and second metallic electrodes and an A.C. power source connected thereto, a plurality of rectifier units each having an anode and a cathode and being series-connected anode-to-cathode between a pair of high voltage D.C. terminals, a first corona shield connected to the cathode of one of said rectifier units and positioned adjacent but spaced away from said first electrode, a second corona shield connected to the anode of said one rectifier unit and positioned adjacent said second electrode whereby A.C. power is capacitively coupled from said power source to said corona shields and an A.C. electric field is established therebetween, a transformer having a first winding connected to heat the cathode of said one rectifier unit and a second winding having two terminals, one of said terminals being connected to said first corona shield, and a probe electrode positioned in said electric field and connected to said second terminal whereby A.C. is capacitively coupled from said second corona shield via said probe electrode to establish an A.C. potential across said second winding and thereby energize said first winding to heat said cathode.

5. Voltage multiplication apparatus as set forth in claim 4 in which said probe electrode is movable within said field, and means for adjusting the position of said probe electrode whereby the A.C. potential across said second winding may be varied to modify the temperature of said heated cathode.

6. Voltage multiplication apparatus as set forth in claim 4 which further includes a shielding electrode connected to said first corona shield and positioned adjacent said probe electrode, and means for adjusting the relative positions of said shielding and probe electrodes in said electric field whereby the A.C. potential across said second winding may be varied to modify the temperature of said heated cathode.

7. Voltage multiplication apparatus as set forth in claim 4 which further includes a shielding electrode connected to said first corona shield and positioned adjacent said probe electrode, and means for moving both said shielding and probe electrodes in said electric field whereby the A.C. potential across said second winding may be varied to modify the temperature of said heated cathode.

8. Voltage multiplication apparatus as set forth in claim 7 where said means for moving said shielding and probe electrodes comprises a shaft adapted to rotate said electrodes about an axis within the plane of said electric field.

9. Voltage multiplication apparatus as set forth in claim 7 wherein said means for moving said shielding and probe electrodes comprises a shaft adapted to rotate said electrodes about an axis substantially perpendicular to said electric field.

10. Voltage multiplication apparatus as set forth in claim 4 which further includes at least one shielding electrode connected to said first corona shield and positioned adjacent said probe electrode, and means for relatively moving said probe and shield electrodes in a plane substantially normal to the plane of said electric field.

11. Voltage multiplication apparatus as set forth in claim 4 in which said probe electrode is positioned in a plane substantially normal to that of said electric field and which further includes a shielding electrode connected to said first corona shield and positioned adjacent said probe electrode, and means for rotating said shielding electrode about said probe electrode on an axis normal to said electric field.

12. Voltage multiplication apparatus comprising first and second opposed metallic electrodes and an A.C. power source connected thereto, a plurality of rectifier units each having an anode and a cathode, said units being positioned between said electrodes and being series-connected anode-to-cathode between a pair of high voltage D.C. terminals, a corona shield connected at each of the electrical junctions thereby formed between said rectifier units, successive corona shields being positioned respectively adjacent said first and second metallic electrodes whereby A.C. power is capacitively coupled from said power source to successive pairs of corona shields to establish a plurality of electric fields therebetween, a transformer associated with each of said rectifier units and having a first winding connected to heat said cathode and a secondary winding having two terminals, one of said terminals being connected to the cathode of its respective rectifier and the other terminal being connected to a probe electrode positioned in the electric field established between the respective associated corona shields whereby A.C. is capacitively coupled to each of said probe electrodes to establish an A.C. potential across each of said windings to heat each of said cathodes.

13. Voltage multiplication apparatus as set forth in claim 12 in which each of said probe electrodes is movable within its respective field, and means for simultaneously adjusting the positions of said probe electrodes whereby the A.C. potentials across each of said second windings may be concurrently varied to modify the temperatures of said heated cathodes.

14. Voltage multiplication apparatus as set forth in claim 13 in which said means includes at least one shaft adapted to rotate said probe electrodes in said electric field.

15. Voltage multiplication apparatus as set forth in claim 12 in which a separate shielding electrode is associated with each probe electrode, and means for simultaneously adjusting the relative positions of each set of associated probe and shielding electrodes within its associated electric field whereby the A.C. potentials across each of said second windings may be concurrently varied to modify the temperatures of said heated cathodes.

16. In high voltage multiplication apparatus including a plurality of cascaded rectifier units each having an anode and a cathode and series-connected anode-to-cathode between a pair of high voltage terminals, and an elongate accelerator tube connected to said terminals; pairs of corona shields arranged in parallel layers on opposite sides of said accelerator tube and normal to the longitudinal axis thereof, an A.C. power source adapted to apply an A.C. potential across each pair of corona shields and establish an electric field therebetween, a transformer associated with each rectifier unit, each transformer having a first winding connected to heat the cathode of its respective rectifier unit and a second winding having a first terminal connected to said cathode and a second terminal connected to a probe electrode positioned in the respective electric field of the associated pair of corona shields whereby A.C. is capacitively coupled via said electrode from said power source to establish an A.C. potential across said second winding and thereby energize said first winding to heat said cathode.

17. In high voltage multiplication apparatus as set forth in claim 16, each of said rectifier units being rotatable on an axis normal to that of said accelerator tube and in the plane of its respective electric field, each of said rectifier tube axes being parallel one with the others, said probe electrode constituting a curved metal plate secured to the rectifier tube, and a similarly shaped shielding electrode also secured to the rectifier tube and connected to the cathode thereof, and means for simultaneously rotating said rectifier tubes about their axes whereby the capacitive coupling between each of said probe electrodes and said accelerator tube is varied to modify the temperatures of the heated cathodes.

18. In high voltage rectification apparatus, a rectifier unit having an anode and a cathode, a transformer associated with said rectifier unit and having a first winding connected to electrically energize said cathode to heat it and a second winding having two terminals, a pair of metallic electrodes spaced and insulated from each other and both affixed to the rectifier unit and movable therewith, one of said terminals being connected to one of said metallic electrodes and the other terminal being connected to the other metallic electrode, an A.C. power source adapted to produce a generally planar A.C. field, and means for moving said rectifier unit and said attached electrodes within said field whereby the relative positions of said electrodes in said field may be adjusted thereby to supply a variable A.C. potential across said second winding and modify the temperature of said heated cathode.

19. Voltage multiplication apparatus comprising first and second opposed elongate metallic electrodes, an elongate accelerator tube positioned between said metallic electrodes and having its longitudinal axis generally aligned with a central longitudinal axis of said elongate metallic electrodes, a plurality of pairs of opposed first and second corona shields arrayed in generally parallel layers along the axis of said accelerator tube and normal thereto, said first corona shields disposed between said first electrode and said accelerator tube, said second corona shields disposed between said second electrode and said accelerator tube, a plurality of rectifier units each having an anode and a cathode, said units being positioned between said pairs of corona shields and series-connected anode-to-cathode between a pair of high voltage D.C. terminals connected to opposite ends of said accelerator tube, said connections between the anode of one rectifier unit and the cathode of the next constituting a sequence of electrical junctions, a first corona shield connected at each alternate junction and a second corona shield connected at each of the remaining junctions, a transformer associated with each rectifier unit and having a first winding connected to the cathode thereof, a second winding for each transformer having two terminals, one of said winding terminals being connected to said cathode and the other to a probe electrode disposed between said accelerator tube and the corona shield connected to the anode of the respective rectifier unit, an A.C. power source connected to said opposed metallic electrodes whereby A.C. power is capacitively coupled to said pairs of corona shields to establish substantially equal A.C. potentials across the anode-cathode circuit of each of said rectifier units and substantially equal electric fields are established between pairs of corona shields, the accelerator tube being at substantially a neutral potential relative thereto, and means for simultaneously varying the capacitive coupling between the respective probe electrodes and the accelerator tube whereby the A.C. potentials across said second transformer windings may be varied concurrently to modify the temperatures of the rectifier unit cathodes.

20. Voltage multiplication apparatus as set forth in claim 19 in which a separate shielding electrode is physically associated with each of said probe electrodes.

21. In high voltage rectification apparatus including a source of A.C. power and a rectifier tube having an anode and a filament, a transformer having a first winding connected across said filament and a second winding having two terminals, said A.C. power source being coupled to said anode and one of said terminals and establishing an A.C. electric field, a metallic electrode connected to said other terminal and positioned in said electric field whereby A.C. is capacitively coupled via said electrode from said power source to establish an A.C. potential across said second winding and thereby energize said first winding to heat said filament, said electrode being movable within said electric field, and means for adjusting the position of said metallic electrode within said field whereby the A.C. potential across said second winding may be varied to modify the temperature of said heated filament.

References Cited in the file of this patent
UNITED STATES PATENTS
2,953,717  Townsend _____ Sept. 20, 1960